(12) United States Patent
Liu et al.

(10) Patent No.: US 12,345,580 B2
(45) Date of Patent: Jul. 1, 2025

(54) FORCE SENSING METHODS AND APPARATUS USING A DEFORMATION SECTION

(71) Applicant: Jiaxing Bogan Technology Co., Ltd., Jiaxing (CN)

(72) Inventors: Shuangwen Liu, Jiaxing (CN); Lei Liu, San Ramon, CA (US)

(*) Notice: Subject to any disclaimer, the term of this patent is extended or adjusted under 35 U.S.C. 154(b) by 310 days.

(21) Appl. No.: 17/949,574

(22) Filed: Sep. 21, 2022

(65) Prior Publication Data

US 2023/0095705 A1   Mar. 30, 2023

(30) Foreign Application Priority Data

Sep. 29, 2021  (CN) .......................... 202111151574.5

(51) Int. Cl.
*G01L 1/22* (2006.01)
*F16B 43/00* (2006.01)
*G01D 21/02* (2006.01)
*G01L 5/24* (2006.01)

(52) U.S. Cl.
CPC ............... *G01L 1/22* (2013.01); *F16B 43/00* (2013.01); *G01D 21/02* (2013.01); *G01L 1/2231* (2013.01); *G01L 5/24* (2013.01)

(58) Field of Classification Search
CPC ........... G01L 1/22; G01L 1/2231; G01L 5/24; G01D 21/02; F16B 43/00
USPC .................................................. 73/862.627
See application file for complete search history.

(56) References Cited

U.S. PATENT DOCUMENTS

| | | | | |
|---|---|---|---|---|
| 3,945,704 A | * | 3/1976 | Kraus | H01R 4/2495 340/687 |
| 4,106,370 A | * | 8/1978 | Kraus | F16B 31/028 73/776 |
| 4,996,873 A | * | 3/1991 | Takeuchi | G01L 23/22 73/754 |
| 5,385,054 A | * | 1/1995 | Kramer | F16B 31/028 73/761 |
| 9,483,674 B1 | * | 11/2016 | Fink | G06K 7/10366 |
| 2003/0042688 A1 | * | 3/2003 | Davie | F16J 15/061 277/590 |
| 2005/0284231 A1 | * | 12/2005 | Zimmerman | G01L 5/24 73/761 |
| 2007/0193361 A1 | * | 8/2007 | Coffey | G01L 5/243 73/780 |
| 2010/0005862 A1 | * | 1/2010 | Davey | G01M 3/2853 411/378 |

(Continued)

FOREIGN PATENT DOCUMENTS

| CN | 201003975 Y | * | 1/2008 | |
|---|---|---|---|---|
| CN | 108019400 A | * | 5/2018 | B23P 15/00 |

(Continued)

OTHER PUBLICATIONS

CN20100397 Jan. 9, 2008 (Year: 2008).*
JP2019086335 Jun. 6, 2019 (Year: 2019).*

*Primary Examiner* — Xin Y Zhong
*Assistant Examiner* — Monica S Young
(74) *Attorney, Agent, or Firm* — Jigang Jin (57) ABSTRACT

A device for sensing a force includes a force-receiving surface with protruding regions and recessed regions, a deformation section, and a sensor for sensing strain caused by deformation of the deformation section.

12 Claims, 6 Drawing Sheets

(56) References Cited

U.S. PATENT DOCUMENTS

| | | | |
|---|---|---|---|
| 2014/0129158 A1* | 5/2014 | Shea | G01L 1/142 |
| | | | 702/57 |
| 2016/0245709 A1* | 8/2016 | Pagani | G01L 1/20 |
| 2019/0226886 A1* | 7/2019 | Bromley | G01L 5/243 |
| 2021/0131473 A1* | 5/2021 | Chopard | F16B 31/02 |
| 2021/0355981 A1* | 11/2021 | Chu | F16B 31/028 |

FOREIGN PATENT DOCUMENTS

| | | | | |
|---|---|---|---|---|
| CN | 113049070 A | * | 6/2021 | |
| CN | 114112163 A | * | 3/2022 | G01L 1/14 |
| CN | 218239137 U | * | 1/2023 | |
| JP | 2012088091 A | * | 5/2012 | |
| JP | 2019086335 A | * | 9/2019 | |
| JP | 2021169998 A | * | 10/2021 | |
| WO | WO-9909327 A1 | * | 2/1999 | F16B 31/02 |

* cited by examiner

FORCE SENSING METHODS AND APPARATUS USING A DEFORMATION SECTION

CROSS-REFERENCE TO RELATED APPLICATION

This application claims priority to Chinese Patent Application No. 202111151574.5 filed on Sep. 29, 2021, the entire content of which is incorporated by reference herein.

FIELD OF INVENTION

This invention generally relates to detection of a force, and specifically to detecting a force through strain measurements.

BACKGROUND OF THE INVENTION

When a force is applied to an object, it can make the object change or deform. The magnitude of the force is usually measured by detecting the change or deformation of the object along the direction of the force. Such a force sensing method, however, has challenges. For example, a gasket with a hollow structure is usually used to measure the tightening force of a bolt. When the bolt is tightened, the gasket is compressed in the axial direction of the bolt, i.e., the direction of the tightening force. The compressive strain created is detected by multiple strain sensors installed in the gasket. The tightening force is calculated using data from the strain sensors. Since the gasket is mounted with the bolt, it has a limited size in the axial direction. The limited size makes it difficult to install strain sensors in the gasket. The disclosed methods and devices may improve certain aspects of force detection.

SUMMARY OF THE INVENTION

In one aspect, a device for sensing a force includes a force receiving surface with protruding regions and recessed regions, a deformation section, and a sensor for sensing strain caused by deformation of the deformation section in a plane perpendicular to the direction of the force. The deformation section is deformed when the force is applied to the protruding regions.

In another aspect, a bolt, nut, double-screw bolt, bolted joint, or threaded fastener includes a force receiving surface with protruding regions and recessed regions, a deformation section, and a sensor for sensing strain caused by deformation of the deformation section in a plane perpendicular to the direction of the force. The deformation section is deformed when the force is applied to the protruding regions.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

DETAILED DESCRIPTION

Detailed description of the present invention is provided below along with figures and embodiments, which further clarifies the objectives, technical solutions, and advantages of the present invention. Wherever possible, the same reference numbers are used throughout the drawings to refer to the same or like parts. It is noted that schematic embodiments discussed herein are merely for illustrating the invention. The present invention is not limited to the embodiments disclosed.

Figure 1A:
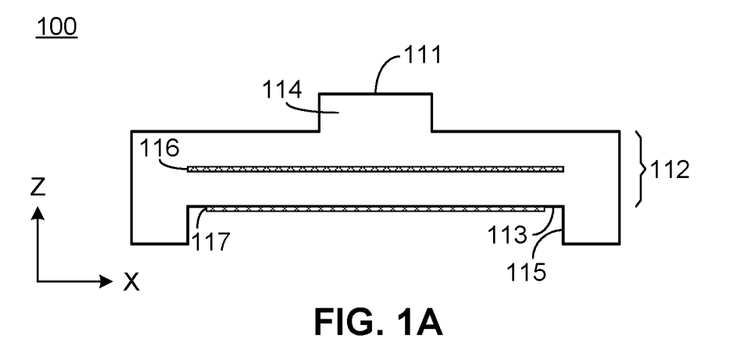
FIGS. 1A and 1B schematically illustrate a cross-sectional view and a top view of a force sensing device, according to embodiments of the present invention.
Figure 1B:
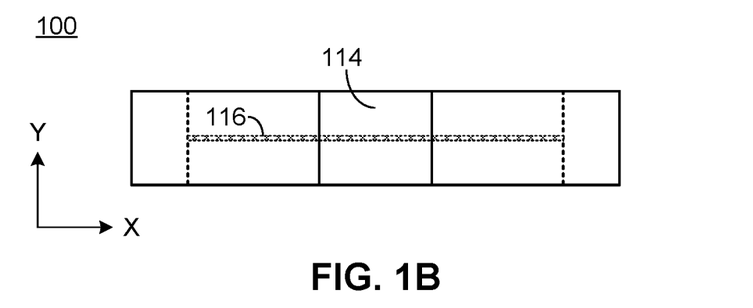
Figure 1C:
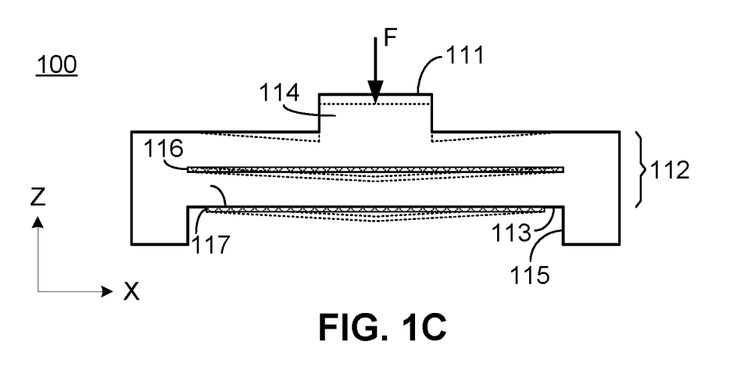
FIG. 1C schematically illustrates a cross-sectional view of the force sensing device shown in FIGS. 1A and 1B when a force is applied, according to embodiments of the present invention.

FIGS. 1A and 1B schematically show a cross-sectional view and a top view of a force sensing device 100 according to embodiments of the present invention. FIG. 1C schematically shows a cross-sectional view of the force sensing device 100 when a force is applied. The cross-sectional views are in an X-Z plane, while the top view is in an X-Y plane. As shown in FIGS. 1A-1C, the force sensing device 100 includes a force receiving surface 111, a deformation section 112, and a second surface 113. The force receiving surface 111 has a protruding part 114 where a force may be applied. The protruding part 114 may also be referred to as a protruding region. The second surface 113 has a recessed part 115. The recessed part 115 may also be referred to as a recessed region. When a force pushes the protruding region 114 toward the recessed region 115 against the Z direction, the protruding part 114 causes the deformation section 112 to deform, which generates strain in the Z, X, and Y directions. The strain in the X direction is detected by a strain sensor 116 embedded in the deformation section 112. In some aspects, the strain in the X direction may also be detected by another strain sensor 117 that is attached to the bottom of the deformation section 112. In some cases, both the sensors 116 and 117 are installed and used to detect a force. Optionally, only one of the sensors 116 and 117 may be mounted and used for the force measurement. The force may be calculated using data obtained from the strain sensor 116 and/or 117.

When a force F is applied against the Z direction, the protruding part 114 is pushed down, which in turn pushes the deformation section 112 downward and causes the deformation section 112 to deform. As shown in FIG. 1C, the displacement of the protruding part 114 and deformation section 112 is depicted schematically in dotted lines. The sensors 116 and 117 experience the strain generated in the X direction. The displacement of the sensors 116 and 117 is also illustrated in dotted lines in FIG. 1C.

In some aspects, the deformation section 112, protruding part 114 and recessed region 115 may be made in one piece, for example, by molding or machining. In some other aspects, the deformation section 112, protruding part 114 and recessed region 115 may be made separately and then assembled together by, e.g., an adhesive epoxy compound, soldering, or fasteners. In some embodiments, the deformation section 112, protruding part 114 and recessed region 115 may be made from the same material by, for example, molding or machining. Optionally, these components may be made from different materials. At least the deformed part of the deformation section 112 contains an elastic material. Elastic materials for the deformation section 112 may include certain metallic material (such as carbon steel, spring steel, and stainless steel), certain plastic material, or certain rubber material. The deformation section 112 may contain one or more elastic materials and one or more layers parallel to the X-Y plane. When the deformation section 112 deforms, it is assumed that the deformation is elastic deformation. That is, the deformation is in the elastic range. As such, the deformation section 112 does not break or fracture when a force is applied to the device 100.

The strain in the deformation section 112 may be detected by a variety of strain detectors, as such a resistance strain sensor, a semiconductor strain sensor, an optical fiber strain sensor, a microwire strain sensor, or any other device capable of sensing the strain or elastic deformation. Provided the sensors 116 and 117 are microwire strain sensors in some cases. A microwire strain sensor may contain a wire or microwire component, e.g., a constantan microwire or nickel chrome alloy microwire. When a force is exerted on the protruding part 114, the deformation section 112 deforms and becomes stretched in the X direction. The stretch makes the microwire longer and thinner, which changes the electrical resistance of the microwire. Hence, the resistance of the microwire may be measured and used to calculate the strain in the deformation section 112, and then the force applied to the device 100 may be derived from values of the strain. In some cases, the microwire of a strain sensor may be fixed at the deformation section 112 by an adhesive epoxy compound. Alternatively, the microwire may be fixed at the deformation section 112 by soldering. The microwire may also be embedded in the deformation section 112 by molding when the deformation section 112 or the three sections are molded.

As aforementioned, the force sensing device 100 may have one or more strain sensors. A strain sensor may be embedded in the deformation section 112 (e.g., the sensor 116), or attached to the bottom surface of the deformation section 112 (e.g., the sensor 117). Optionally, multiple strain sensors may be embedded in or attached to the deformation section 112. For example, with respect to FIG. 1B, two additional strain sensors that are similar to the senor 116 may be disposed beside the sensor 116 in the X-Y plane. The sensor 116 may be between the two additional sensors. When more strain sensors are used, the strain and force may be detected more accurately.

The descriptions above describe certain aspects of the force sensing method. That is, a force is detected along a direction different from the direction of the force, such as perpendicular to the direction of the force. Various embodiments with the same or similar principles and structures may be configured. Some of such embodiments are illustrated below.

Figure 2:
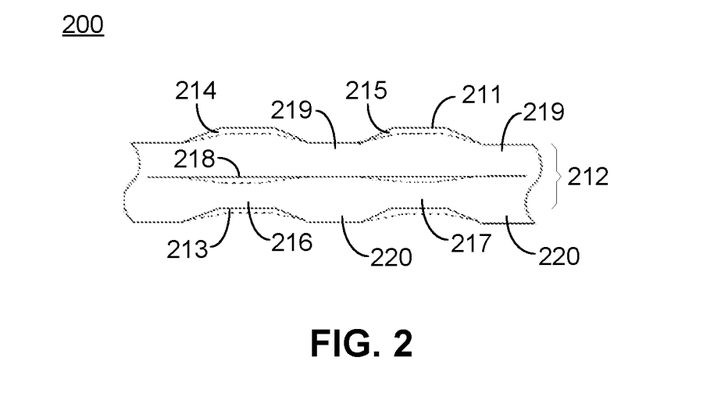
FIG. 2 schematically illustrates a cross-sectional view of another force sensing device, according to embodiments of the present invention.

FIG. 2 schematically shows a cross-sectional view of a part of a device 200 for sensing a force according to embodiments of the present invention. The cross-sectional view is taken along a line or path in a horizontal plane or X-Y plane. To a certain extent, the structure of the device 200 is similar to that of the device 100. As shown in FIG. 2, the force sensing device 200 includes a force receiving surface 211, a deformation section 212, and a second surface 213. The force receiving surface 211 contains protruding regions 214 and 215, as well as recessed regions 219. The second surface 213 contains recessed regions 216 and 217, as well as protruding regions 220. The protruding regions 214 and 215 are aligned with the recessed regions 216 and 217 along the vertical direction or Z direction (i.e., the direction of the force), respectively. The recessed region 219 is aligned with the protruding region 220 along the vertical direction or Z direction. The device 200 may have additional protruding regions (not shown) and recessed regions (not shown). The deformation section 212 may extend along a line such as a path in the X direction. Alternatively, the deformation section 212 may have a ring shape (or annular shape) in the horizontal plane. In such cases, the protruding regions and recessed regions may be configured along circular paths in the ring. The protruding regions and recessed regions 214-217 and 219-220 may be integrated and made by molding or machining. Alternatively, these regions may be made separately and assembled together.

When a force is applied on the device 200, the force is divided by and exerted on the protruding regions. The force pushes down the protruding regions and creates displacement of the deformation section 212, as shown by the dotted lines in FIG. 2. For example, when the force pushes the protruding region 214 downwards, the protruding region 214 in turn presses a segment of the deformation section 212 between the protruding region 214 and the recessed region 216. The segment of the deformation section 212 deforms, creating strain in the deformation section. In the same manner, other segments of the deformation section 212 are deformed by the force. The strain in the deformation section 212 may be detected by a sensor 218, which may be displaced by the force as shown in dotted lines in FIG. 2. In some cases, the sensor 218 may be similar to the sensor 116 of the device 100, such as a resistance strain gauge, a semiconductor strain gauge, an optical fiber strain gauge, or a microwire strain gauge. In some aspects, the sensor 218 may be a strain sensor that extends through and detects the strain in the deformation section 212. Alternatively, the sensor 218 may be arranged along the outside of the deformation session 212. Then, the magnitude of the force may be calculated using the strain data. In certain other cases, more strain sensors may be installed at the device 200, e.g., on a side or both sides of the sensor 218 in the deformation section 212. Alternatively, the sensor 218 disposed along a path may be replaced by multiple sensors arranged at different positions along the path.

Figure 3A:
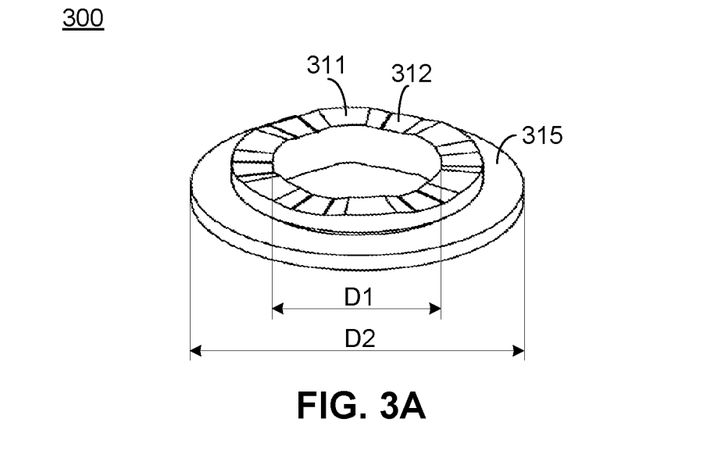
FIGS. 3A and 3B schematically illustrate structural diagrams of another force sensing device, according to embodiments of the present invention.
Figure 3B:
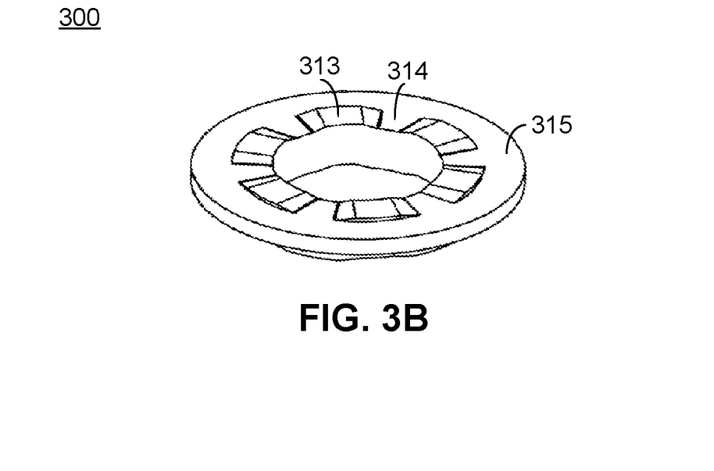

FIGS. 3A and 3B schematically show structural diagrams of a force sensing device 300 according to embodiments of the present invention. FIG. 3A shows a view of the force receiving surface, while FIG. 3B shows a view of the second surface. The force sensing device 300 has similar principles to that of the force sensing device 200. The structure of the device 300 is also similar to that of the device 200 when the device 200 has a ring shape. As shown in FIGS. 3A and 3B, the force receiving surface of the device 300 contains protruding regions 311 and recessed regions 312 alternately arranged along a first circular path. In some aspects, the protruding regions 311 and the recessed regions 312 are evenly distributed along a circumferential direction. The second surface contains protruding regions 313 and recessed regions 314 alternately arranged along a second circular path. The protruding regions 311 are aligned with the recess regions 314 along the vertical direction or Z direction, respectively. The deformation section of the device 300 is disposed between the protruding regions 311 and recessed regions 314, has an annular shape in a horizontal plane, and looks like a ring. The device 300 also includes a deformation section 315.

When a force is applied on the device 300, the force is divided by and exerted on the protruding regions 311. The force pushes down the protruding regions and creates deformation of the deformation section. For example, when the force pushes the protruding regions 311 downwards, the protruding regions 311 presses segments of the deformation section, generating strain in the deformation section along a third circular path. The first, second, and third circular paths are concentric around the axis of the deformation section with the annular shape. The strain in the deformation section may be detected by one or more strain sensors (e.g., similar to the sensor 116 of the device 100). In some cases, a microwire sensing component may be installed along the third circular path in the deformation section. The magnitude of the force may be calculated using the strain data.

As shown in FIG. 3A, the force sensing device 300 has an inner diameter D1 and outer diameter D2. The inner diameter is also the inside diameter of the deformation section, and may have a value that fits the size of a bolt. For example, the inner diameter D1 may be 21 or 25 mm, which fits the M20 or M24 blots. In some aspects, the outer diameter D2 may be arranged to fit a gasket. For example, the outer diameter D2 may be 39 or 44 mm, suitable for a standard M20 or M24 gasket. Optionally, the overall height of the device 300 may be 9 mm for certain applications.

Figure 4A:
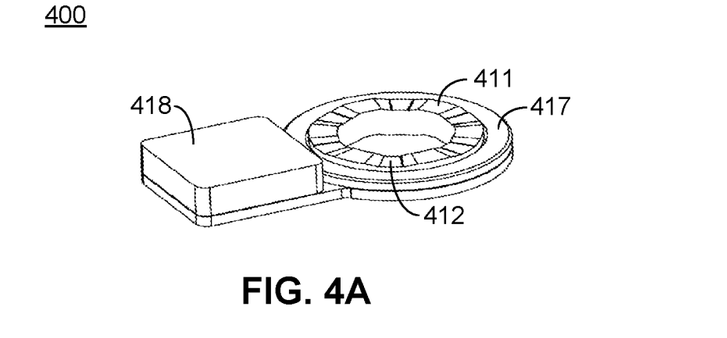
FIGS. 4A and 4B schematically illustrate a structural diagram and an exploded view of another force sensing device, according to embodiments of the present invention.
Figure 4B:
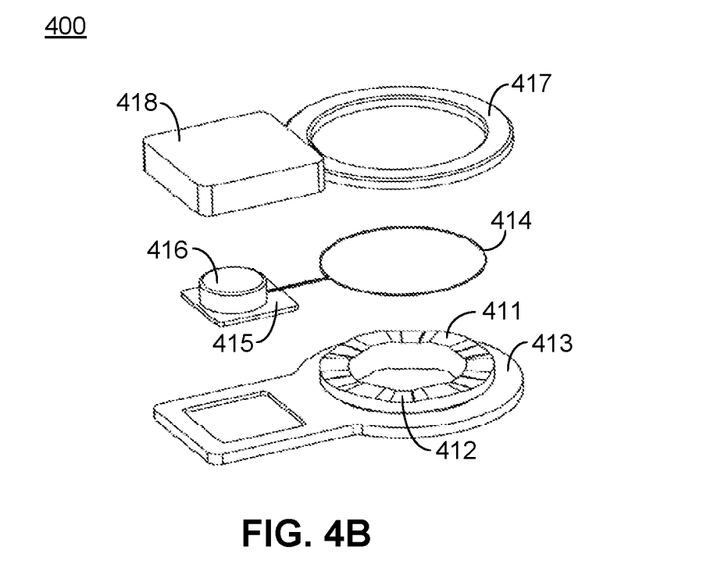

FIGS. 4A and 4B schematically show a structural diagram and an exploded view of a force sensing device 400 according to embodiments of the present invention. The force sensing device 400 has the same principles as that of the force sensing device 300. The force-sensing structure of the device 400 is similar to or the same as that of the device 300. As shown in FIGS. 4A and 4B, the device 400 contains protruding regions 411 and valleys 412 alternately arranged along a first circular path in the force receiving surface. The protruding regions 411 are aligned with the recess regions (not shown) in the second surface along the vertical direction or Z direction, respectively. The deformation section 413 of the device 400 has a ring shape. The protruding regions 411 and recess regions are configured along the first circular path and a second circular path in the ring.

When a force is applied to the force receiving surface of the device 400, the force is divided by and exerted on the protruding regions 411. The force pushes down the protruding regions and creates deformation of the deformation section. For example, when the force pushes the protruding regions 411 downwards, the protruding regions 411 press segments of the deformation section, generating strain in the deformation section along a third circular path. The first, second, and third circular paths are concentric around the axis of the deformation section with the ring shape. The strain in the deformation section may be detected by one or more strain sensors, such as a sensor 414 with a wire or microwire component extending along the third circular path and embedded in the deformation section. Optionally, the sensor 414 may also be used to detect the elastic deformation in the deformation section. In some other cases, the sensor 414 may have multiple sensing regions arranged along the third circular path in the deformation section. The magnitude of the force may be calculated using data of the strain.

The protruding regions 411, the deformation section, and the second surface of the device 400 may be integrated and made by molding and/or machining in some cases. Further, the force sensing device 400 may have other parts or components optionally. For example, the device 400 may contain a circuit board 415, a microprocessor (not shown) for data acquisition and analysis, a power supply module 416 for providing power, a cover 417, and a housing 418 for the circuit board 415, microprocessor, and power supply module 416. The power supply module may optionally include a battery and/or an energy harvesting device that collects energy from the ambient environment. Further, the device 400 may have a communication module (not shown) for transmitting certain strain data to a remote management system. The communication module may have a wired or wireless communication component. The device 400 may also have a temperature sensor, a humidity sensor, and an attitude sensor. In some aspects, the device 400 may have a state indication unit. The state indication unit may include a light-emitting device, a display, or a buzzer, which may be used to show values of the strain, the force, and/or the tightness state of a bolt or nut.

Figure 4C:
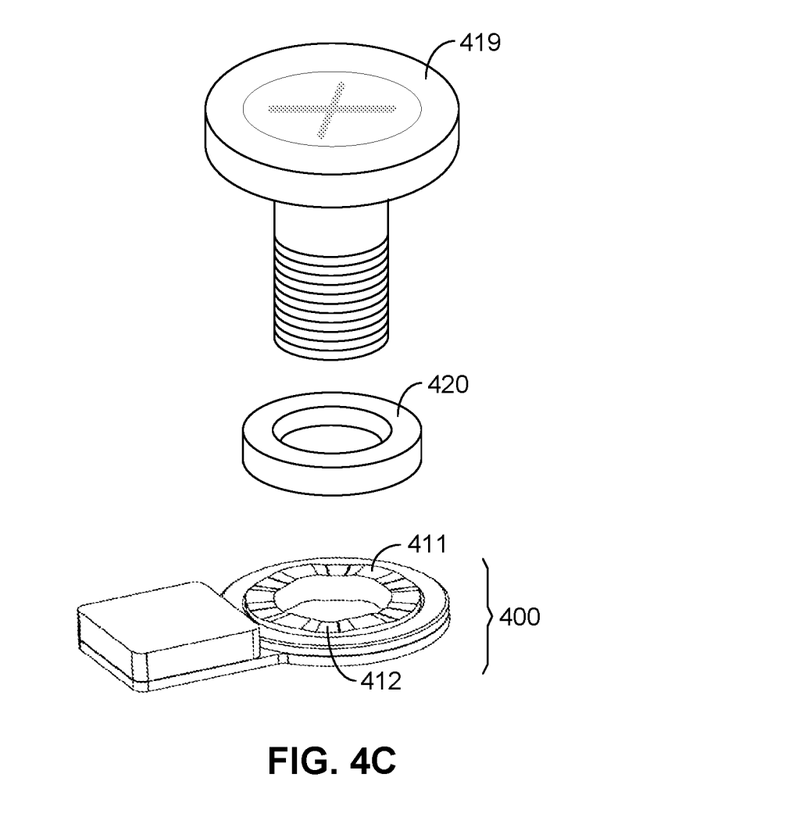
FIG. 4C schematically illustrates structural diagrams of a bolt, a washer, and the force sensing device shown in FIGS. 4A and 4B, according to embodiments of the present invention.

The inner diameter of the deformation section of the device 400 may be selected to fit the size of a bolt. For example, the device 400 may be used with a bolt 419 and a washer 420, as shown schematically in FIG. 4C. Assuming the diameter of the bolt 419 fits the inner diameter of the deformation section. When the bolt 419 is used to fasten a plate (not shown) on a surface, the device 400 may be put on the plate, and then the bolt 419 may go through the washer 420, the device 400, and the plate. Alternatively, the bolt 419 and device 400 may be used together to fasten the plate without the washer 420. When the bolt 419 is tightened, the tightening force presses and deforms the deformation section via the washer 420 and the protruding regions 411. As such, the tightness state of the bolt 419 may be determined using strain data collected from the sensor 414.

Figure 5A:
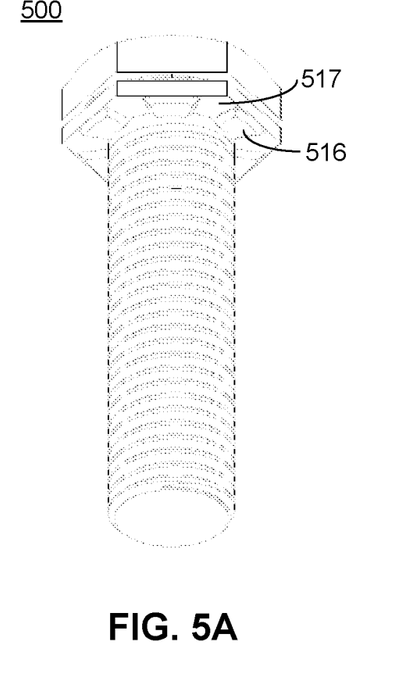
FIGS. 5A-5C schematically illustrate a structural diagram, a side view, and a bottom view of a bolt with a force sensing function, according to embodiments of the present invention.
Figure 5B:
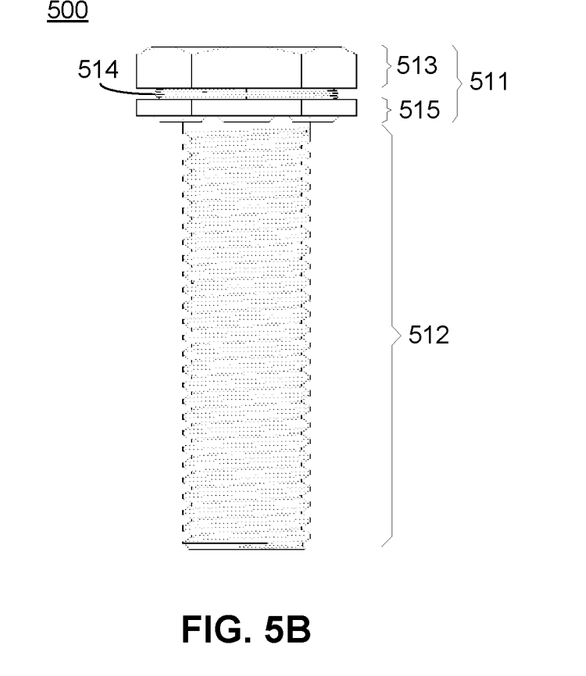
Figure 5C:
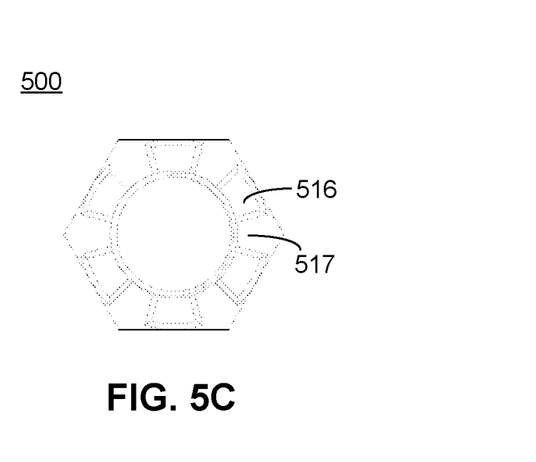

FIGS. 5A, 5B, and 5C schematically show a structural diagram, a side view, and a bottom view of a bolt 500 according to embodiments of the present invention. Optionally, the bolt 500 may be a double-screw bolt, bolted joint, or threaded fastener. The bolt 500 includes a head 511 and a shank 512 with an external thread. The head 511 includes sections 513, 514, and 515. The section 513 is the upper part of the head 511. The section 515 is the lower part of the head 511 and has a force receiving surface. The force receiving surface has protruding regions 516 and recess regions 517. The protruding regions 516 and recess regions 517 are alternately arranged along a first circular path. The section 514 is the deformation section and contains a strain sensor. The strain sensor may be a microwire strain sensor. The bolt 500 may look like a regular bolt with a regular size except the force sensing function. The axis of the bolt 500 goes through centers of the section 513 and the shank 512. The strain sensor in the section 514 may be similar to the sensor 414 of FIG. 4B. For example, the strain sensor may have a wire or microwire element extending along a second circular path and embedded in the section 514. The first and second circular paths are concentric around the axis of the bolt 500.

When the bolt 500 is tightened to fasten an object, a force is applied to the sections 514 and 515. The force creates deformation and strain in the section 514. The strain (or elastic deformation) in the section 514 is detected by the strain sensor. Alternatively, the strain sensor may have multiple sensing elements arranged, e.g., side by side. The bolt 500 may have certain other parts such as the wiring, a data processing module, a microprocessor, a power supply module, and/or a communication module. These parts are omitted in the figures for simplicity. After data of the strain is obtained, the magnitude of the force may be calculated, and the tightness of the bolt 500 may be determined by the magnitude of the force.

Figure 6A:
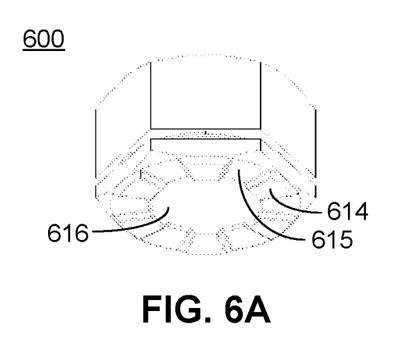
FIGS. 6A-6C schematically illustrate a structural diagram, a side view, and a bottom view of a nut with a force sensing function, according to embodiments of the present invention.
Figure 6B:
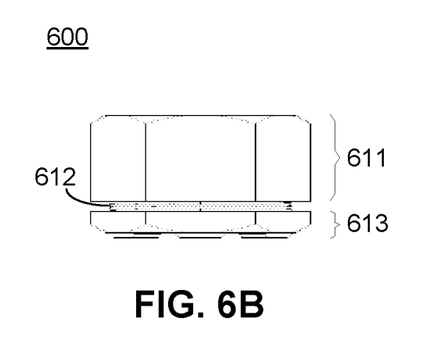
Figure 6C:
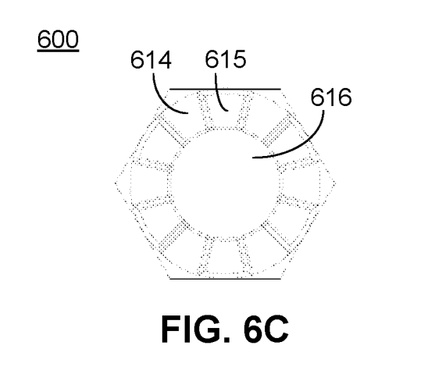

FIGS. 6A, 6B, and 6C schematically show a structural diagram, a side view, and a bottom view of a nut 600 according to embodiments of the present invention. Optionally, the nut 600 may be a threaded fastener. The nut 600 includes sections 611, 612, and 613. The section 611 is the upper part of the nut 600. The section 613 is the lower part of the nut 600 and has a force receiving surface. The force receiving surface includes protruding regions 614 and recess regions 615. The section 612 is the deformation section and contains a strain sensor. The strain sensor may be a microwire strain sensor. The protruding regions 614 and recess regions 615 are alternately arranged along a first circular path. The nut 600 has a threaded hole 616 through it along the axis of the nut 600, and may look like a regular nut with a regular size except the force sensing function. The axis of the nut 600 goes through centers of the section 611 and hole 616. The strain sensor in the section 612 may be similar to the sensor 414 of FIG. 4B. For example, the strain sensor may have a wire or microwire component extending along a second circular path and embedded in the section 612. The first and second circular paths are concentric around the axis of the nut 600. The nut 600 contains an interior thread on the sidewall of the hole 616. In some aspects, the interior thread is configured in the section 611.

When the nut 600 is tightened, a force is applied to the sections 612 and 613. The force creates deformation and strain in the section 612. The strain (or elastic deformation) in the section 612 may be detected by the strain sensor. The strain sensor may also have multiple sensing regions arranged, e.g., side by side. The nut 600 may have certain other parts such as the wiring, a data processing module, a microprocessor, a power supply module, and/or a communication module. These parts are omitted in the figures for simplicity. After the data of the strain is obtained, the magnitude of the force may be calculated, and the tightness of the nut 600 may be determined by the magnitude of the force.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. A device for sensing a force applied along a direction, comprising:
   a deformation section, the deformation section having an annular shape in a plane perpendicular to the direction of the force and including:
      a first surface as a force-receiving surface on a first side of the deformation section, comprising a plurality of first protruding regions protruding against the direction of the force and distributed along a first circular path parallel to the plane and a plurality of first recessed regions, the plurality of first protruding regions and the plurality of first recessed regions are alternately arranged along the first circular path; and
      a second surface on a second side of the deformation section opposite to the first side, comprising a plurality of second protruding regions protruding along the direction of the force and distributed along a second circular path parallel to the plane and a plurality of second recessed regions, the plurality of second protruding regions and the plurality of second recessed regions are alternately arranged along the second circular path,
   wherein the plurality of first protruding regions is aligned with the plurality of second recessed regions respectively along the direction of the force, the plurality of first recessed regions is aligned with the plurality of second protruding regions respectively along the direction of the force, and the deformation section is deformed when the force is applied to the plurality of first protruding regions; and
   a sensor arranged in the deformation section for sensing strain or elastic deformation caused by deformation of the deformation section, wherein the sensor includes a wire or microwire component extending along a third circular path parallel to the plane, and the first, second, and third circular paths are concentric around an axis along the direction of the force.

2. The device of claim 1, wherein the deformation section includes an elastic material.

3. The device of claim 1, wherein the sensor is a resistance strain gauge, a semiconductor strain gauge, an optical fiber strain gauge, or a microwire strain gauge.

4. The device of claim 1, wherein the sensor is embedded in the deformation section.

5. The device of claim 1, wherein the sensor is arranged along an outside of the deformation section.

6. The device of claim 1 further comprising a microprocessor, a power supply module, or a communication module.

7. A fastening system involving applying a force for fastening, comprising:
   a deformation section, the deformation section having an annular shape in a plane perpendicular to a direction of the force and including:
      a first surface as a force-receiving surface on a first side of the deformation section, comprising a plurality of first protruding regions protruding against the direction of the force and distributed along a first circular path parallel to the plane and/or a plurality of first recessed regions, the plurality of first protruding regions and the plurality of first recessed regions are alternately arranged along the first circular path; and
      a second surface on a second side of the deformation section opposite to the first side, comprising a plurality of second protruding regions protruding along the direction of the force and distributed along a second circular path parallel to the plane and a plurality of second recessed regions, the plurality of second protruding regions and the plurality of second recessed regions are alternately arranged along the second circular path,
   wherein the plurality of first protruding regions is aligned with the plurality of second recessed regions respectively along the direction of the force, the plurality of first recessed regions is aligned with the plurality of second protruding regions respectively along the direction of the force, and the deformation section is deformed when the force is applied to the plurality of first protruding regions;

a bolt arranged to go through the deformation section; and a sensor arranged in the deformation section for sensing tightness of the bolt by detecting strain or elastic deformation caused by deformation of the deformation section when the bolt is tightened to apply the force, wherein the sensor includes a wire or microwire component extending along a third circular path parallel to the plane, and the first, second, and third circular paths are concentric around an axis along the direction of the force.

8. The fastening system of claim 7, wherein the deformation section includes an elastic material.

9. The fastening system of claim 7, wherein the sensor is a resistance strain gauge, a semiconductor strain gauge, an optical fiber strain gauge, or a microwire strain gauge.

10. The fastening system of claim 7, wherein the sensor is embedded in the deformation section.

11. The fastening system of claim 7, wherein the sensor is arranged along an outside of the deformation section.

12. The fastening system of claim 7 further comprising a microprocessor, a power supply module, or a communication module.

* * * * *